United States Patent [19]

Fisher et al.

[11] Patent Number: 4,813,053
[45] Date of Patent: Mar. 14, 1989

[54] METHOD AND APPARATUS FOR PREIONIZING A SELF-SUSTAINED GAS DISCHARGE DEVICE

[75] Inventors: Charles H. Fisher; Mark A. DiFaccio, both of Bellevue, Wash.

[73] Assignee: Spectra-Physics, Inc., San Jose, Calif.

[21] Appl. No.: 103,930

[22] Filed: Sep. 30, 1987

[51] Int. Cl.⁴ ............................................. H01S 3/097
[52] U.S. Cl. ...................................... 372/86; 372/25; 372/9; 372/33
[58] Field of Search ............... 372/86, 87, 25, 83, 372/69, 9, 74, 8, 33

[56] References Cited

U.S. PATENT DOCUMENTS

| | | | |
|---|---|---|---|
| 3,842,366 | 10/1974 | Gordon et al. | 372/86 |
| 4,008,444 | 2/1977 | Zar et al. | 372/74 |
| 4,147,995 | 4/1979 | Leiby, Jr. | 372/86 |
| 4,168,475 | 9/1979 | Schimitschek et al. | 372/86 |
| 4,203,078 | 5/1980 | Daugherty et al. | 372/86 |
| 4,230,994 | 10/1980 | Bradley | 372/86 |
| 4,262,267 | 4/1981 | Shimitschek et al. | 372/86 |

Primary Examiner—Leon Scott, Jr.
Attorney, Agent, or Firm—Seed and Berry

[57] ABSTRACT

A method and an apparatus for preionizing a lasing gas mixture in a gas discharge laser. A short pulse of ionizing particles, such as electrons produced by an electron beam are beamed from the electron source, through a window and into the laser container to preionize a gas mixture containing $CO_2$, $N_2$, and He. Immediately after the gas mixture has been preionized, the discharge voltage is raised from a sustaining level to a discharge-maintaining level. The gas mixture can be maintained in its excited state for an extended time, and a longer pulse of laser light results. The electron beam and the discharge voltage can be coordinated by a control system connected to the high voltage sources used to produce the electron beam and the gas discharge.

46 Claims, 2 Drawing Sheets

METHOD AND APPARATUS FOR PREIONIZING A SELF-SUSTAINED GAS DISCHARGE DEVICE

TECHNICAL FIELD

This invention relates to gas discharge devices, and more particularly, to a method and an apparatus for preionizing the gas mixture of a gas discharge device.

BACKGROUND ART

Gas discharge devices (such as lasers) typically operate by exciting a gas, such as neon, helium, or carbon dioxide ($CO_2$), to a highly ionized plasma state and producing coherent light when the excited gas emits light of a characteristic energy (i.e., discharging). The gas, which is generally retained under pressure in a closed vessel, is excited to the higher energy, plasma, state in a discharge region located between two electrodes. The plasma is generally formed by imposing a high voltage between electrodes disposed on opposite sides of the discharge region.

Once the gas discharge device has begun to produce its light, it enters a self-sustaining mode. In this mode, the gas contained in the discharge region carries a current in excess of a characteristic threshold level (the sustaining current) and, as a result, sustains its own discharge for an extended period of time.

A gas discharge device operates in a pulsed mode, since the energy produced in the form of light must be refreshed from time to time by re-imposing the voltage across the discharge region. The pulses are typically 10 to 20 microseconds in duration.

If the gas discharge device is a laser, two optical assemblies, such as mirrors, are located at opposite sides of the pressure vessel. At least one of the optical assemblies is partially transmissive. The optical assemblies cause the discharge light beam to be reflected therebetween and define an optical axis for the laser light that passes through the partially transmissive optical assembly.

It has been found that a self-sustaining gas discharge device can produce longer pulses than are otherwise possible if the gas in the discharge region is maintained in an ionized state while it is discharging. An electron beam is a particularly convenient way of ionizing the gas in the discharge region. However, external electron beam sources for producing long duration electron beams are fragile and cumbersome.

It is therefore desirable to have a long pulse self-sustaining gas discharge device without the requirement of using a long duration electron beam source.

DISCLOSURE OF THE INVENTION

It is an object of the present invention to provide a gas discharge device, such as a laser, that produces light pulses having extended durations.

It is another object of the present invention to provide an ionized gas discharge device that does not require continuous ionization of the gas.

It is a further object of the present invention to provide a gas discharge device that ionizes the gas mixture prior to causing the gas mixture of discharge.

It is a still another object of the present invention to provide a method for preionizing a gas discharge device.

According to one aspect, the invention is a preionized gas discharge device that includes a container and an ionizable gas mixture contained within the container, the ionizable gas mixture being capable of discharging. The invention further comprises discharge voltage means for selectively producing a discharge voltage and electrode means connected to the discharge voltage means for causing the gas mixture to discharge in response to the discharge voltage imposed across the electrode means by the discharge voltage means. In addition, the invention comprises ionizing beam means for selectively producing an ionizing beam capable of ionizing the gas mixture and directing the ionizing beam into the container and control means for controlling the operation of the ionizing beam means and the discharge voltage means. The control means causes the ionizing beam source to direct the ionizing beam into the container to ionize the gas mixture prior to the discharge voltage means imposing the discharge voltage across the electrode means.

In another aspect, the invention is a preionized gas discharge laser that comprises a laser container and an ionizable gas mixture contained within the laser container, the ionizable gas mixture being capable of lasing. The invention further comprises discharge voltage means for selectively producing a discharge voltage and electrode means connected to the discharge voltage means, for causing the gas mixture to lase in response to the discharge voltage imposed across the electrode means by the discharge voltage means. In addition, the invention comprises ionizing beam means for selectively producing an ionizing beam capable of ionizing the gas mixture and directing the ionizing beam into the laser container, and control means for controlling operation of the ionizing beam means and the discharge voltage means. The control means causing the ionizing beam means to direct the ionizing beam into the laser container to ionize the gas mixture prior to the discharge voltage means imposing the discharge voltage across the electrode means.

In a further aspect, the invention comprises a method for preionizing a gas discharge device having a container containing an ionizable gas mixture, where the ionizable gas mixture is capable of lasing in response to a controllable discharge voltage imposed between electrode means. The method comprises the steps of controllably producing an ionizing beam consisting of a series of pulses, controllably directing the ionizing beam into the container to ionize the gas mixture, and imposing the discharge voltage between the electrode means.

BEST MODES FOR CARRYING OUT THE INVENTION

Figure 1:
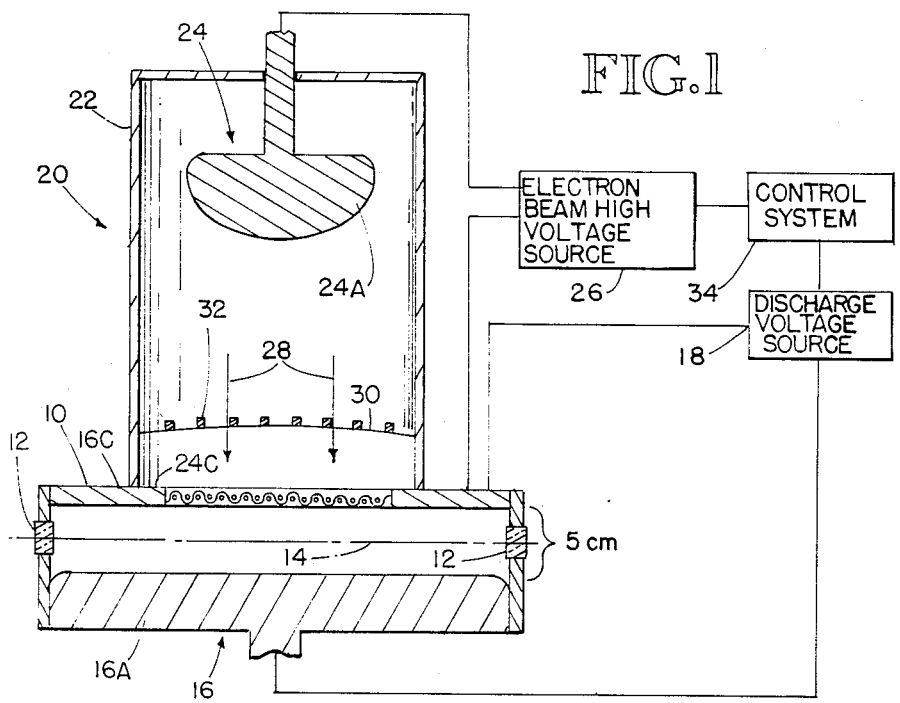
FIG. 1 is a cross-sectional schematic diagram of the apparatus of the present invention.

Referring to FIG. 1, the present invention includes a laser container 10 which has been filled with an ionizable gas mixture. An example of an appropriate gas mixture is a mixture of approximately six percent carbon dioxide ($CO_2$), twelve percent nitrogen ($N_2$), and eighty-one percent helium (He). The laser container 10 is sealed to the outside atmosphere and includes two optical assemblies 12, such as mirrors, distributed along an optical axis 14 and positioned at opposite ends of the container 10. At least one of the optical assemblies 12 is partially transmissive to the laser light that is produced along the optical axis 14 inside the container means 10.

Within the container 10, or in its close proximity, are two electrodes 16, including an anode 16A and a cathode 16C which are positioned generally on opposite sides of the optical axis 14. The anode 16A can be, for example, a length of a conductive metal placed adjacent one side of the container 10. The cathode 16C can be, as shown in the embodiment of FIG. 1, a length of a conductive metal partially composed of a screen 16S, placed adjacent an opposite side of the container 10. The cathode 16C and anode 16A, for example, can each be five centimeters wide and ninety centimeters long, and the gap between them can be five centimeters. If desired, the cathode 16C and the anode 16A can be exchanged, with the anode 16A being partially composed of a screen.

In order for the gas mixture contained in the container 10 to discharge, the gas mixture must be excited. The excitation is provided by applying a discharge voltage between the anode 16A and the cathode 16C. The discharge voltage is supplied by the controllable discharge voltage source 18. As the discharge voltage builds, the gas mixture becomes excited into a plasma state and a discharge current begins to pass between the electrodes 16. After the discharge voltage reaches a threshold level, the discharging action of the gas mixture becomes self-sustaining.

By preionizing the gas mixture before the discharge voltage is applied by the discharge voltage source 18, the discharging action of the gas mixture in the container 10 can be maintained for longer periods of time, thereby resulting in longer pulses of laser light. The ionization can be created by injecting an ionizing beam into the laser container 10 between the electrodes 16. This energy can be in the form of ionized particles, X-rays, or ultraviolet light. However, the ionization is preferably created by injecting a beam of electrons supplied from an electron source 20. The electron source 20 can take the form of a low-pressure discharge source, a field emission source, or a thermionic plasma cathode source.

If the electron source 20 is a low-pressure discharge source, it includes an electron beam enclosure 22 that is filled with a very low pressure atmosphere of a stable gas. For example, the electron beam enclosure 22 can be filled with He at a pressure of 20 mTorr. The electron source 20 will also include two electrodes 24, one being an electron beam anode 24A and the other an electron beam cathode. In FIG. 1 the electron beam cathode is the container cathode 16C which then serves as the cathode of both the discharge electrodes 16 and the electron source electrodes 24. When the electrodes 24 are connected to a high voltage source 26, capable of producing a maximum voltage of, for example, 50 to 150 kilovolts, electrons are boiled from the anode 24A and accelerated toward the electron source cathode 24C. If, for example, the voltage between the electrodes 24 is 100 kilovolts, the electrons produced by the electron source 20 have an energy of 100 kiloelectron volts (keV). Electrons with energies of about this level, or more, are capable of ionizing the gas mixtures that are used with gas discharge lasers if the density of the current is approximately 10 to 20 milliamperes per square centimeter, or more. When, as shown in FIG. 1, the electron source cathode is a screen such as the screen 16S, the electrons which are accelerated by the voltage between the electrodes 24 pass out of the electron beam enclosure 22 in the beam direction shown by the arrow 28 and into the container 10.

The electron source 20 can be placed closely to the container 10 in order to maximize the electron beam current entering the container 10. Since the gas mixture in the electron beam enclosure 22 is kept at a very low pressure and the gas mixtures in the container 10 and the electron beam enclosure 22 are different, a mechanism must be used to keep the two gas mixtures separate. The mechanism used in the present embodiment is a thin film 30 that allows the electrons to pass from the electron source 20 to the container 10. The film 30 must have sufficient strength to withstand the pressure differential between the container 10 and the electron beam enclosure 22. One suitable material is a Kapton ® film with an aluminum coating. A supporting structure 32 is placed inside the electron beam enclosure 22 close to the film 30 and is attached for support to the electron beam enclosure 22.

If, for example, the screen cathode 24C is a rectangle about five centimeters wide and ninety centimeters long, the electron beam current can be supplied by ten separate electron beam discharge sources, each having an inner diameter of approximately eight centimeters, rather than the single discharge source shown in FIG. 1. If the high voltage source 26 produces eighty amperes of current, the current losses through the cathode 24C, the film 30, and the cathode 16C reduce the current density reaching the ionizable gas mixture to approximately 20 milliampere per square centimeter.

It has been discovered that, by properly coordinating the voltages applied to the discharge electrodes 16 and the electron source electrodes 24, the gas mixture in the container 10 can be ionized before the discharge voltage reaches its self-sustaining threshold. The result is that the laser system can produces longer laser pulses than possible without preionizing the gas mixture.

The discharge voltage source 18 and the electron source high voltage source 26 are connected to and controlled by a control system 34 to coordinate their operation. While the control system 34 can take the form of a pulse-forming network, it can also be a pulse delay generator that produces pulses on two lines, one delayed with respect to the other. The delayed line of the pulse delay generator is connected to the discharge voltage source 18, and the other line is connected to the electron source high voltage source 26.

Figure 2A:
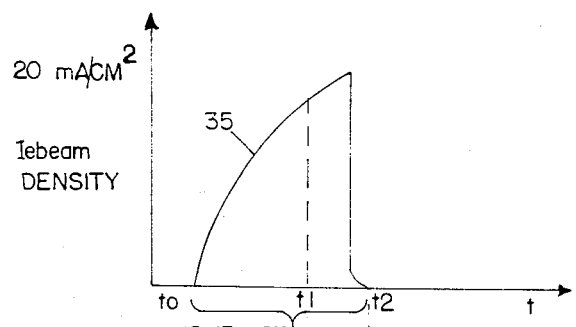
FIG. 2A is a graph of the time response of the current density produced by the electron beam source, according to one aspect of the present invention.
Figure 2B:
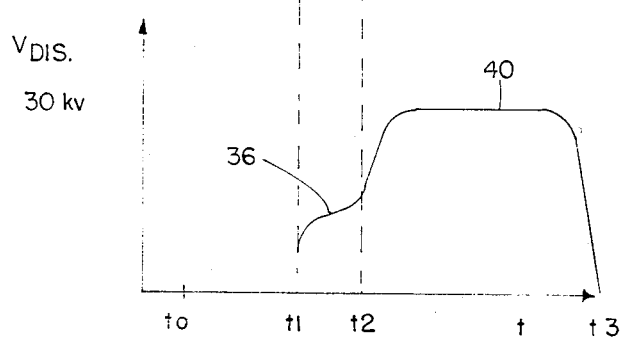
FIG. 2B is a graph of the time response of the voltage produced by the discharge voltage source used in the present invention.
Figure 2C:
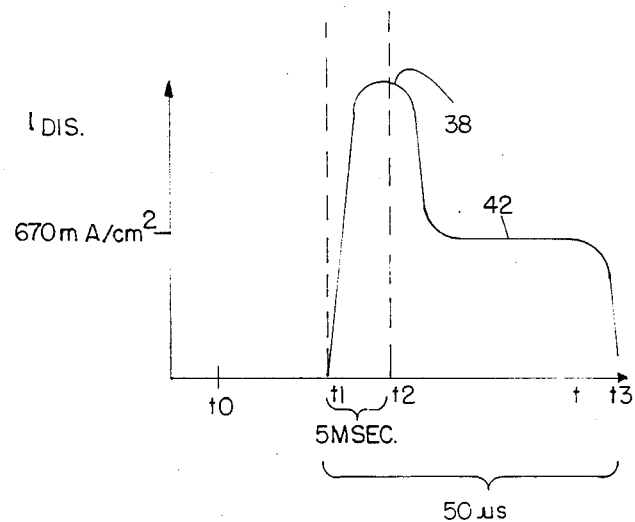
FIG. 2C is a graph of the time response of the current produced by the discharge voltage source used in the present invention.

FIGS. 2A–2C are graphs of the time responses of important variables that relate to preionizing the gas mixture in the container 10. FIG. 2A is a graph of current density produced by the discharge source 20. It shows a pulse 35 whose duration is between 10 and 15 microseconds (between times $t_0$ and $t_2$), with a maximum magnitude of approximately 20 milliamperes per square centimeter or more. This desired electron beam current can be produced by properly driving the electron source electrodes 24 with the high voltage source 26. The electron source current can be turned off abruptly (at time $t_2$) after the gas mixture in the container 10 has been adequately preionized. As the electron source current pulse is building to its maximum value (e.g., approximately the last five microseconds of the electron source current pulse, from time $t_1$ to $t_2$), the voltage supplied to the electrodes 16 by the discharge voltage source 18 can be brought to a sustaining level 36 (see FIG. 2B). Concurrently, the discharge current (see FIG. 2C) rises to a maximum current 38 well in excess of a maintaining level 42 of approximately 670 milliamperes per square centimeter. After the electron source current is turned off, the discharge voltage rises to a maintaining level 40 of approximately 30 kV. At the same time, the discharge current diminishes to the maintaining level 42. If desired, the duration of the pulse 35 can be decreased if the energy of the ionizing beam is increased.

After the excitation energy provided to the gas mixture in the container 10 has been depleted in the form of a pulse of laser light, the discharge voltage and current are turned off (at time $t_3$). The duration of the laser light pulse can be as great as approximately 50 microseconds.

While the detailed description above has been expressed in terms of ionizing a specific gas mixture by an electron source, those skilled in the art will appreciate that many other gas mixtures having different ionizing and discharge-maintaining current densities can be used, as well as many other forms of ionizing energy. Accordingly, it can be appreciated that various modifications of the above-described embodiments may be made without departing from the spirit and the scope of the invention. Therefore, the spirit and the scope of the present invention are to be limited only by the following claims.

We claim:

1. A preionized gas discharge device, comprising:
   a container;
   an ionizable gas mixture contained within the container;
   discharge voltage means for selectively producing a discharge voltage;
   electrode means, connected to the discharge voltage means for causing the gas mixture to discharge in response to the discharge voltage imposed across the electrode means by the discharge voltage means;
   ionizing beam means located externally of the container for selectively producing an ionizing beam capable of ionizing the gas mixture and directing the ionizing beam into the container; and
   control means for controlling the ionizing beam means and the discharge voltage means, the control means causing the ionizing beam source to direct a pulsed ionizing beam into the container to ionize the gas mixture and subsequently causing the discharge voltage means to impose a pulsed discharge voltage across the electrode means, the duration of the pulsed ionizing beam being substantially shorter than the duration of the pulsed discharge voltage.

2. The preionized gas discharge device of claim 1 wherein the electrode means includes at least one electrode shaped to allow the pulsed ionizing beam to pass therethrough and into the container.

3. The preionized gas discharge device of claim 1 wherein the ionizing beam has electron beam means for selectively producing an ionizing electron beam, the electron beam means including:
   enclosure means for containing a stable gas mixture;
   an anode within the enclosure means;
   a cathode within the enclosure means; and
   a controllable high voltage source connected between the anode and the cathode for imposing an ionizing voltage across the anode and the cathode.

4. A preionized gas discharge device, comprising:
   a container;
   an ionizable first gas mixture including carbon dioxide gas, nitrogen gas, and helium gas contained within the container;
   two discharge electrodes positioned within the container with the ionizable first gas mixture therebetween;
   controllable discharge voltage means connected to the two discharge electrodes for producing a discharge voltage of a predetermined level and causing the first gas mixture in the container to discharge in response to the discharge voltage imposed across the discharge electrodes;
   an electron beam source selectively producing an electron beam for ionizing the first gas mixture and directing the electron beam into the container, including:
     an electron beam enclosure containing a
     second gas mixture including helium gas;
     an anode within the electrode beam enclosure;
     a cathode within the electron beam enclosure, the second gas mixture being between the anode and the cathode; and
     source voltage means for selectively producing a maximum voltage of approximately 100 kilovolts voltage between the anode and the cathode; and
   a control system for controlling the operation of the electron beam source to produce a pulsed electron beam from the electron beam enclosure into the container and subsequently causing the discharge voltage means to produce a pulsed discharge voltage across the two discharge electrodes, the duration of the pulsed ionizing beam being substantially shorter than the duration of the pulsed discharge voltage.

5. The preionized gas discharge laser of claim 4 wherein the electron beam enclosure further includes window means for transmitting the electron beam into the enclosure.

6. A preionized gas discharge device, comprising:
   a first container means containing an ionizable first gas mixture, the first gas mixture being held at a first pressure;
   a controllable first discharge voltage source;
   two discharge electrodes connected to the first discharge voltage source for causing the first gas mixture to discharge in response to the discharge voltage controllably imposed between the two discharge electrodes by the discharge voltage source;
   a controllable ionizing beam source, the beam produced by the ionizing beam source being directed into the first container means; and
   a control system for controlling the ionizing beam source and the first discharge voltage source, the control system causing the ionizing beam source to direct a pulsed ionizing beam into the first container means to ionize the first gas mixture and subsequently causing the first gas mixture to discharge by imposing a pulsed discharge voltage between the two discharge electrodes, the duration of the pulsed ionizing beam being substantially shorter than the duration of the pulsed discharge voltage.

7. The preionized gas discharging device of claim 6 wherein one of the electrodes is shaped to allow the pulsed ionizing beam to pass therethrough and into the first container means.

8. The preionized gas discharge device of claim 6 wherein the energy of the ionizing beam is in the range of approximately 50 kilo electron volts to 150 kilo electron volts.

9. The preionized gas discharge device of claim 6 wherein the controllable ionizing beam source is an electron beam source including:
an electron beam enclosure containing a stable second gas mixture, the second gas mixture being held at a second pressure;
an electron beam anode within the electron beam enclosure;
an electron beam cathode within the electron beam enclosure; and
a controllable second high voltage source connected between the electron beam anode and the electron beam cathode to produce a beam of electrons thereby.

10. The preionized gas discharge device of claim 9 wherein the electron beam cathode is connected to one of the two discharge electrodes.

11. The preionized gas discharge device of claim 9 wherein the electron beam cathode is one of the two discharge electrodes.

12. The preionized gas discharge device of claim 9 wherein the second pressure is a low subatmospheric pressure.

13. The preionized gas discharge device of claim 9 wherein the second gas mixture includes helium.

14. The preionized gas discharge device of claim 9 wherein the voltage between the electron beam cathode and the electron beam anode reaches a maximum in the range of approximately 50 kilovolts to 150 kilovolts.

15. The preionized gas discharge device of claim 6 wherein the discharge voltage imposed between the two discharge electrodes is approximately 30 kilovolts.

16. The preionized gas discharge device of claim 6 wherein the first pressure is approximately atmospheric pressure.

17. The preionized gas discharge device of claim 6 wherein the beam produced by the ionizing beam source is a beam of electrons having a maximum current density in the range of approximately 10 to 20 milliamperes per square centimeter.

18. A preionized gas discharge device, comprising:
a discharge enclosure means containing an ionizable fist gas mixture including carbon dioxide gas, nitrogen gas, and helium gas, the first gas mixture being held at a first pressure;
a controllable first discharge voltage source;
two discharge electrodes connected to the first discharge voltage source for causing the first gas mixture in the discharge enclosure to discharge in response to the discharge voltage imposed between the two discharge electrodes by the discharge voltage source;
a controllable electron beam source, the electron beam produced by the electron beam source being directed into the discharge enclosure, including:
electron beam enclosure means;
a second gas mixture, including helium gas, contained within the electron beam enclosure means, the second gas mixture being held at a second pressure;
an electron beam anode within the electron beam enclosure means;
an electron beam cathode within the electron beam enclosure means; and a controllable high voltage source connected between the electron beam anode and the electron beam cathode for producing a voltage pulse having a maximum voltage in the range of approximately 50 kilovolts to 150 kilovolts; and a control system for causing the controllable electron beam source to produce a pulsed beam of electrons from the electron beam enclosure means to the discharge enclosure means and subsequently imposing a discharge voltage in the range of approximately 30 kilovolts between the two discharge electrodes, the duration of the pulsed ionizing beam being substantially shorter than the duration of the pulsed discharge voltage.

19. The preionized gas discharge device of claim 18 wherein the first gas pressure is held at approximately atmospheric pressure, and the second gas pressure is a low subatmospheric pressure.

20. The preionized gas discharge device of claim 18 wherein the high voltage source of the electron beam source produces a pulsed beam of electrons having a duration of between 10 and 15 microseconds.

21. The preionized gas discharge device of claim 18 wherein the electron beam enclosure means further includes a window that transmits the electron beam into the discharge enclosure means.

22. The preionized gas discharge device of claim 21 wherein the window of the electron beam enclosure is made from Kapton ®.

23. The preionized gas discharge device of claim 20 wherein one of the two discharge electrodes is a cathode including an electron beam-transmissive screen adjacent the window of the electron beam enclosure.

24. A preionized gas discharge laser, comprising:
a laser container;
an ionizable laser gas mixture contained within the laser container;
controllable discharge voltage means for producing a discharge voltage;
electrode means, connected to the discharge voltage means, for causing the laser gas mixture to lase in response to the discharge voltage imposed across the electrode means by the discharge voltage means;
ionizing beam means for selectively producing an ionizing beam for ionizing the gas mixture and directing the ionizing beam into the laser container; and
control means for controlling the ionizing beam means and the discharge voltage means, the control means causing the ionizing beam means to direct a pulsed ionizing beam into the laser container to ionize the gas mixture and subsequently causing the discharge voltage means to impose a pulsed discharge voltage across the electrode means, the duration of the pulsed ionizing beam being substantially shorter than the duration of the pulsed discharge voltage.

25. The preionized gas discharge laser of claim 24 wherein the electrode means includes at least one electrode shaped to allow the ionizing beam to pass therethrough and into the laser container for imposing a high voltage between the electron beam anode and the electron beam cathode to produce a beam of electrons.

26. The preionized gas discharge laser of claim 24 wherein the ionizing beam means has electron beam means for selectively producing an ionizing electron beam, the electron beam means including:
   enclosure means for containing a stable gas mixture;
   an electron beam anode within the enclosure means;
   an electron beam cathode within the enclosure means; and
   a controllable high voltage source connected between the electron beam anode and the electron beam cathode for imposing an ionizing voltage across the electron beam anode and the electron beam cathode to produce a beam of electrons thereby.

27. A preionized gas discharge laser, comprising:
   a laser container containing an ionizable first laser gas mixture, the duration of the pulsed ionizing beam being substantially shorter than the duration of the pulsed discharge voltage;
   first controllable discharge voltage means for producing a discharge voltage;
   two discharge electrodes connected to the first controllable discharge voltage means for causing the first gas mixture to lase in response to the discharge voltage imposed across the two discharge electrodes by the first controllable discharge voltage means;
   ionizing beam means for selectively producing a ionizing beam capable of ionizing the first laser gas mixture and directing the ionizing beam into the laser container; and
   control means for controlling the ionizing beam means and the discharge voltage means, the control means causing the ionizing beam means to direct a pulsed ionizing beam into the laser container to ionize the first laser gas mixture and subsequently causing the discharge voltage means to impose a pulsed discharge voltage across the two discharge electrodes, the duration of the pulsed ionizing beam being substantially shorter than the duration of the pulsed discharge voltage.

28. The preionized gas discharge laser of claim 27 wherein one of the electrodes is shaped to allow the ionizing beam to pass therethrough and into the laser container.

29. The preionized gas discharge laser of claim 27 wherein the energy of the pulsed ionizing beam is in the range of approximately 50 kiloelectron volts to 150 kiloelectron volts.

30. The preionized gas discharge laser of claim 27 wherein the ionizing beam means has electron beam means for selectively producing an ionizing beam, the electron beam means including:
   an electron beam enclosure containing a stable second gas mixture, the second gas mixture being held at a second pressure;
   an electron beam anode within the electron beam enclosure;
   an electron beam cathode within the electron beam enclosure; and
   a controllable second high voltage source connected between the electron beam anode and the electron beam cathode to impose an ionizing voltage across the electron beam anode and the electron beam cathode and to produce a beam of electrons thereby.

31. The preionized gas discharge laser of claim 30 wherein the second gas pressure is a low subatmospheric pressure.

32. The preionized gas discharge laser of claim 30 wherein the second gas mixture includes helium.

33. The preionized gas discharge laser of claim 27 wherein the beam produced by the ionizing beam source is a beam of electrons having a maximum current density in the range of approximately 10 to 20 milliamperes per square centimeter.

34. A preionized gas discharge laser, comprising:
   a laser enclosure containing an ionizable first gas mixture including carbon dioxide gas, nitrogen gas, and helium gas, the first gas mixture being held at a first pressure;
   first controllable discharge voltage means for producing a discharge voltage;
   two discharge electrodes connected to the first discharge voltage means for causing the first gas mixture to lase in response to the discharge voltage imposed across the two discharge electrodes by the discharge voltage source;
   a controllable electron beam source, the electron beam produced by the electron beam source being directed into the laser enclosure, including:
   an electron beam enclosure;
   a second gas mixture, including helium gas, contained within the electron beam enclosure, the second gas mixture being held at a second pressure;
   an electron beam anode within the electron beam enclosure;
   an electron beam cathode within the electron beam enclosure; and
   a controllable second high voltage source connected between the electron beam anode and the electron beam cathode for producing a voltage pulse having a maximum voltage in the range of approximately 50 kilovolts to 150 kilovolts; and
   control means for controlling the ionizing beam means and the discharge voltage means, the control means causing the ionizing beam means to direct a pulsed ionizing beam into the laser container to ionize the first gas mixture and subsequently the discharge voltage means to impose a pulsed discharge voltage of approximately 30 kilovolts across the two discharge electrodes.

35. The preionized gas discharge laser of claim 34 wherein the first pressure is approximately atmospheric pressure, and the second gas pressure is a low subatmospheric pressure.

36. The preionized gas discharge laser of claim 35 wherein the high voltage source of the electron beam source produces a pulsed beam of electrons having a duration of between 10 and 15 microseconds.

37. The preionized gas discharge device of claim 35 wherein the electron beam enclosure means further includes a window that transmits the electron beam into the discharge enclosure means.

38. The preionized gas discharge laser of claim 37 wherein the window of the electron beam enclosure is made from Kapton ®.

39. A preionized gas discharge laser for producing a beam of laser light along an axis, comprising:
   a laser enclosure located along the axis, including optical assemblies placed along the axis and containing an ionizable first gas mixture including carbon dioxide gas, nitrogen gas, and helium gas;

a controllable first discharge voltage source;

two discharge electrodes connected to the first discharge voltage source for causing the first gas mixture in the laser enclosure to lase in response to the discharge voltage imposed between the two discharge electrodes by the discharge voltage source, the light produced by the lasing first gas mixture being radiated along the axis;

a controllable electron beam source, the electron beam produced by the electron beam source being directed into the laser enclosure, including:

an electron beam enclosure;

a second gas mixture, including helium gas, contained within the electron beam enclosure;

an electron beam anode within the electron beam enclosure;

an electron beam cathode within the electron beam enclosure; and a controllable high voltage source connected between the electron beam anode and the electron beam cathode for producing a voltage pulse having a maximum voltage of approximately 100 kilovolts; and a control system for producing a pulsed beam of electrons from the electron beam enclosure to the laser enclosure and subsequently imposing a discharge voltage pulse of approximately 30 kilovolts across the pair of electrodes, the duration of the pulsed ionizing beam being substantially shorter than the duration of the pulsed discharge voltage.

40. A method of preionizing a gas discharge device having a container containing an ionizable gas mixture, the ionizable gas mixture being capable of discharging in response to a controllable discharge voltage pulse imposed between electrode means, comprising the steps of:
(a) controllably producing an ionizing beam;
(b) controllably directing the ionizing beam into the container to ionize the gas mixture; and
(c) imposing the discharge voltage pulse between the electrode means and the duration of the high voltage pulse is substantially shorter than the duration of the discharge voltage pulse.

41. The method of claim 40 wherein step (a) further comprises the steps of:
(a1) putting a stable gas mixture in an enclosure enclosing an anode and a cathode;
(a2) connecting a controllable high voltage source between the anode and the cathode; and
(a3) causing the controllable high voltage source to generate a high voltage pulse between the anode and the cathode, thereby producing the ionizing beam.

42. A method for preionizing a gas discharge device having a container containing an ionizable gas mixture, the ionizable gas mixture being capable of discharging in response to a controllable discharge voltage pulse imposed between electrode means, comprising the steps of:
(a) controllably producing a pulsed ionizing beam consisting of a series of pulses;
(b) controllably directing the pulsed ionizing beam into the container to ionize the gas mixture; and
(c) imposing the discharge voltage pulse between the electrode means in synchronism with and substantially immediately after each pulse of the pulsed ionizing beam and the duration of the high voltage pulse is substantially shorter than the duration of the discharge voltage pulse.

43. A method for preionizing a gas discharge device having a container containing an ionizable gas mixture, the ionizable gas mixture being capable of discharging in response to a controllable discharge voltage pulse imposed between an electrode means, comprising the steps of:
(a) controllably producing an electron beam pulse;
(b) controllably directing the electron beam pulse into the container to ionize the gas mixture; and
(c) imposing the discharge voltage pulse between the electrode means and the duration of the high voltage pulse is substantially shorter than the duration of the discharge voltage pulse.

44. The method of claim 43 wherein step
(a) further comprises the steps of:
(a1) putting a stable gas mixture in an enclosure means enclosing an electron beam anode and an electron beam cathode;
(a2) connecting a controllable high voltage source between the electron beam anode and the electron beam cathode; and
(a3) causing the controllable high voltage source to generate a high voltage pulse between the electron beam anode and the electron beam cathode, thereby producing the electron beam.

45. A method of preionizing a gas discharge laser having a laser container containing an ionizable gas mixture, the ionizable gas mixture being capable of lasing in response to a controllable discharge voltage pulse imposed between electrode means, comprising the steps of:
(a) controllably producing a pulsed electron beam consisting of a series of pulses;
(b) controllably directing the pulsed electron beam into the laser container to ionize the gas mixture; and
(c) imposing the discharge voltage pulse between the electrode means in synchronism with and substantially immediately after each pulse of the pulsed electron beam and the duration of the high voltage pulse is substantially shorter than the duration of the discharge voltage pulse.

46. The method of claim 45 wherein step (a) further comprises the steps of:
(a1) putting a stable gas mixture in an enclosure means enclosing an electron beam anode and an electron beam cathode;
(a2) connecting a controllable high voltage source between the electron beam anode and the electron beam cathode; and
(a3) causing the controllable high voltage source to generate a series of high voltage pulses between the electron beam anode and the electron beam cathode, thereby producing the electron beam.

* * * * *

UNITED STATES PATENT AND TRADEMARK OFFICE
CERTIFICATE OF CORRECTION

PATENT NO. : 4,813,053
DATED : March 14, 1989
INVENTOR(S) : Charles H. Fisher; Mark A. DiFaccio It is certified that error appears in the above-identified patent and that said Letters Patent is hereby corrected as shown below:

In claim 3, column 5, line 63, following "beam", insert --means--.

In claim 7, column 7, line 1, delete "discharging" and substitute therefor --discharge--.

In claim 18, column 7, line 51, delete "fist" and substitute therefor --first--.

In claim 40, column 11, line 32, delete "of" and substitute therefor --for--.

Signed and Sealed this

Twelfth Day of December, 1989

*Attest:*

JEFFREY M. SAMUELS

*Attesting Officer*     *Acting Commissioner of Patents and Trademarks*